(12) United States Patent
Akarca et al.

(10) Patent No.: US 10,882,383 B2
(45) Date of Patent: Jan. 5, 2021

(54) VEHICLE ENERGY ABSORBING MEMBER

(71) Applicant: Nissan North America, Inc., Franklin, TN (US)

(72) Inventors: Semsettin Subutay Akarca, Canton, MI (US); Patrick Grattan, Wixom, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 16/206,013

(22) Filed: Nov. 30, 2018

(65) Prior Publication Data

US 2020/0171927 A1   Jun. 4, 2020

(51) Int. Cl.
*B60J 5/04* (2006.01)

(52) U.S. Cl.
CPC .......... *B60J 5/0461* (2013.01); *B60J 5/0443* (2013.01)

(58) Field of Classification Search
CPC ....... B60J 5/0461; B60J 5/0443; B32B 7/022; B32B 3/26
USPC ............................ 296/146.5, 146.6
See application file for complete search history.

(56) References Cited

U.S. PATENT DOCUMENTS

| | | | |
|---|---|---|---|
| 3,868,796 A | 3/1975 | Bush | |
| 4,599,843 A * | 7/1986 | Ingvarsson | B60J 5/0444 296/146.6 |
| 5,102,163 A * | 4/1992 | Ishikawa | B60R 21/0428 280/751 |
| 6,164,716 A | 12/2000 | Palazzolo et al. | |
| 7,341,277 B2 * | 3/2008 | Huttsell | B60J 5/0425 280/751 |
| 7,357,444 B2 * | 4/2008 | Cowelchuk | B60R 21/0428 188/376 |
| 8,979,119 B2 * | 3/2015 | Suesada | B60R 21/23138 280/730.2 |
| 9,592,721 B1 | 3/2017 | Kelly et al. | |
| 2004/0075295 A1 | 4/2004 | Schmidt | |
| 2011/0169302 A1 * | 7/2011 | Deng | B60J 5/042 296/187.12 |

(Continued)

FOREIGN PATENT DOCUMENTS

| | | |
|---|---|---|
| DE | 2414114 A1 | 10/1974 |
| DE | 102012009353 A1 | 11/2013 |

(Continued)

*Primary Examiner* — Joseph D. Pape
(74) *Attorney, Agent, or Firm* — Global IP Counselors, LLP (57) ABSTRACT

A vehicle door assembly includes an inner door panel, an outer door panel and an energy absorbing member. The outer door panel being configured such that at least a portion of an outer periphery thereof is fixed to an outer periphery of the inner door panel, the inner door panel and the outer door panel defining a hollow interior therebetween. The hollow interior has an upper end and a lower end. The energy absorbing member is installed within the hollow interior between the inner door panel and the outer door panel. The energy absorbing member has an outboard end surface with a first predetermined surface area and an inboard end surface having a second predetermined surface area greater than the first predetermined surface area. The energy absorbing member is spaced apart from the upper end of the hollow interior and being spaced apart from the lower end of the hollow interior.

19 Claims, 7 Drawing Sheets

(56) References Cited

U.S. PATENT DOCUMENTS

2013/0057018 A1   3/2013   Reese

FOREIGN PATENT DOCUMENTS

| EP | 1088691 | A2 | 4/2001 |
| WO | 0125055 | A1 | 4/2001 |

* cited by examiner

VEHICLE ENERGY ABSORBING MEMBER

BACKGROUND

Field of the Invention

The present invention generally relates to a vehicle energy absorbing member. More specifically, the present invention relates to a vehicle energy absorbing member installed within a hollow interior of a vehicle door, the vehicle energy absorbing member being made of an energy absorbing and resilient material that absorbs impact energy during a side impact event and distributes impact energy along a vehicle longitudinal length of the door such that a portion of the impact energy is transmitted through the structure of the door to pillar structures on each vehicle longitudinal end of the vehicle door.

Background Information

Side impact events can cause the structure of a vehicle door to deform, moving inboard into a passenger compartment of a vehicle.

SUMMARY

One object of the present disclosure is to provide a vehicle door with an energy absorbing member installed within a hollow interior of a vehicle door, the vehicle energy absorbing member being made of an energy absorbing and resilient material that absorbs impact energy during a side impact event and distributes impact energy along a vehicle longitudinal length of the door such that a portion of the impact energy is transmitted through the structure of the door to pillar structures on each vehicle longitudinal end of the vehicle door.

In view of the state of the known technology, one aspect of the present disclosure is to provide a vehicle door assembly with an inner door panel, an outer door panel, and, an energy absorbing member. The outer door panel is configured such that at least a portion of an outer periphery thereof is fixed to an outer periphery of the inner door panel. The inner door panel and the outer door panel define a hollow interior therebetween. The hollow interior has an upper end and a lower end. The energy absorbing member is installed within the hollow interior between the inner door panel and the outer door panel. The energy absorbing member has an outboard end surface with a first predetermined surface area and an inboard end surface having a second predetermined surface area greater than the first predetermined surface area. The energy absorbing member is spaced apart from the upper end of the hollow interior and being spaced apart from the lower end of the hollow interior.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
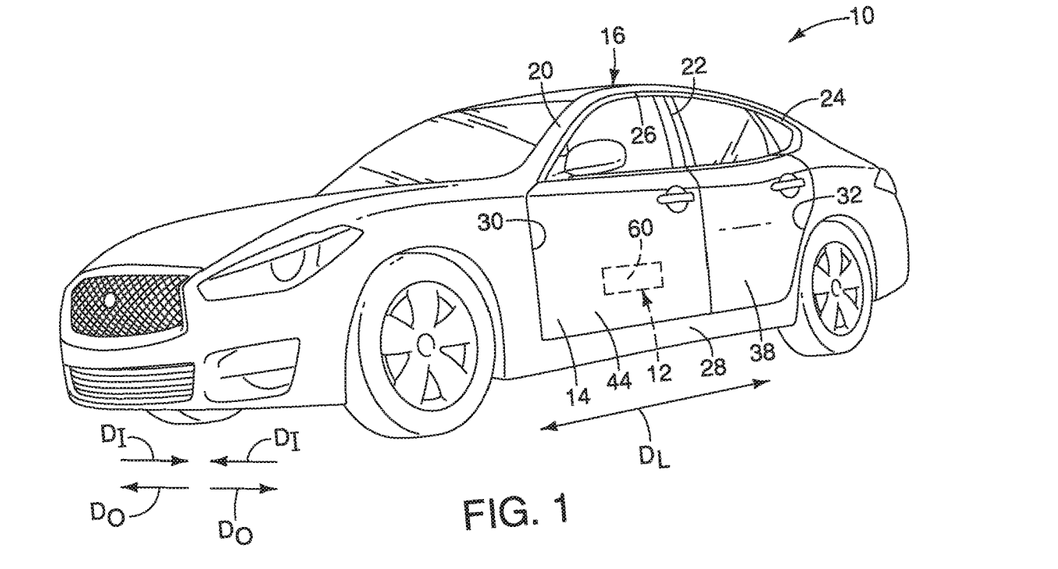
FIG. 1 is a perspective view of a vehicle having an energy absorbing member installed within a hollow interior of a door of the vehicle, in accordance with a first embodiment.

Referring initially to FIG. 1, a vehicle 10 having an energy absorbing member 12 concealed within a door 14 is illustrated in accordance with a first embodiment. The energy absorbing member 12 is configured such that during a side impact event where impact energy is applied to an outer surface of the door 14, impact energy from the impact event is transmitted through the door 14, to the energy absorbing member 12, and dispersed along an entire width of the door 14, as is described in greater detail below.

As shown in FIG. 1, the vehicle 10 has a vehicle body structure 16 that includes at least an A-pillar 20, a B-pillar 22, a C-pillar 24, a roof rail 26 and a sill structure 28. The A-pillar 20, the B-pillar 22, a forward section of the roof rail 26 and a forward section of the sill structure 28 together surround and define a front door opening 30. The B-pillar 22, the C-pillar 24, a rearward section of the roof rail 26 and a rearward section of the sill structure 28 together surround and define a rear door opening 32. As shown in FIG. 1, the vehicle 10 and the vehicle body structure 16 define a vehicle longitudinal direction $D_L$, vehicle inboard directions $D_I$ and vehicle outboard directions $D_O$. The vehicle longitudinal direction $D_L$ is defined as a direction relative to the length of the vehicle 10 or directions parallel to the length of the vehicle 10 (front to back and/or back to front). The vehicle inboard directions $D_I$ are defined as directions facing the center of the vehicle 10 from laterally outboard locations, or movement laterally inboard toward the center of the vehicle 10. The vehicle outboard directions $D_O$ are defined as directions facing away from the center of the vehicle 10 or movement laterally outboard away from the center of the vehicle 10.

As shown removed from the vehicle 10, the vehicle 10 further includes the door 14 (also referred to as the front door 14) and a rear door 38 (FIG. 1). The front door 14 is pivotally installed to the A-pillar 20 of the vehicle body structure 16 via hinges H (FIG. 4), in a conventional manner, such that the front door 14 covers the front door opening 30 in a closed orientation, as shown in FIG. 1. In the closed orientation, the front door 14 spans the front door opening 30 from the A-pillar 20 to the B-pillar 22. Similarly, the rear door 38 is pivotally installed to the B-pillar 22 of the vehicle body structure 16 via hinges H (FIG. 4), in a conventional manner, such that the rear door 38 covers the rear door opening 32 in a closed orientation, as shown in FIG. 1. In the closed orientation, the rear door 38 spans the rear door opening 32 from the B-pillar 22 to the C-pillar 24.

In a first embodiment depicted in FIGS. 1-5, one, or, both of the front door 14 and the rear door 38 can include the energy absorbing member 12. For the sake of brevity, the inclusion of the energy absorbing member 12 within the front door 14 is depicted and described herein below. However, it should be understood from the drawings and the description herein below, that the rear door 38 can also be provided with the energy absorbing member 12. Therefore, description of the front door 14 and the energy absorbing member 12 is equally applicable to the rear door 38.

Figure 2:
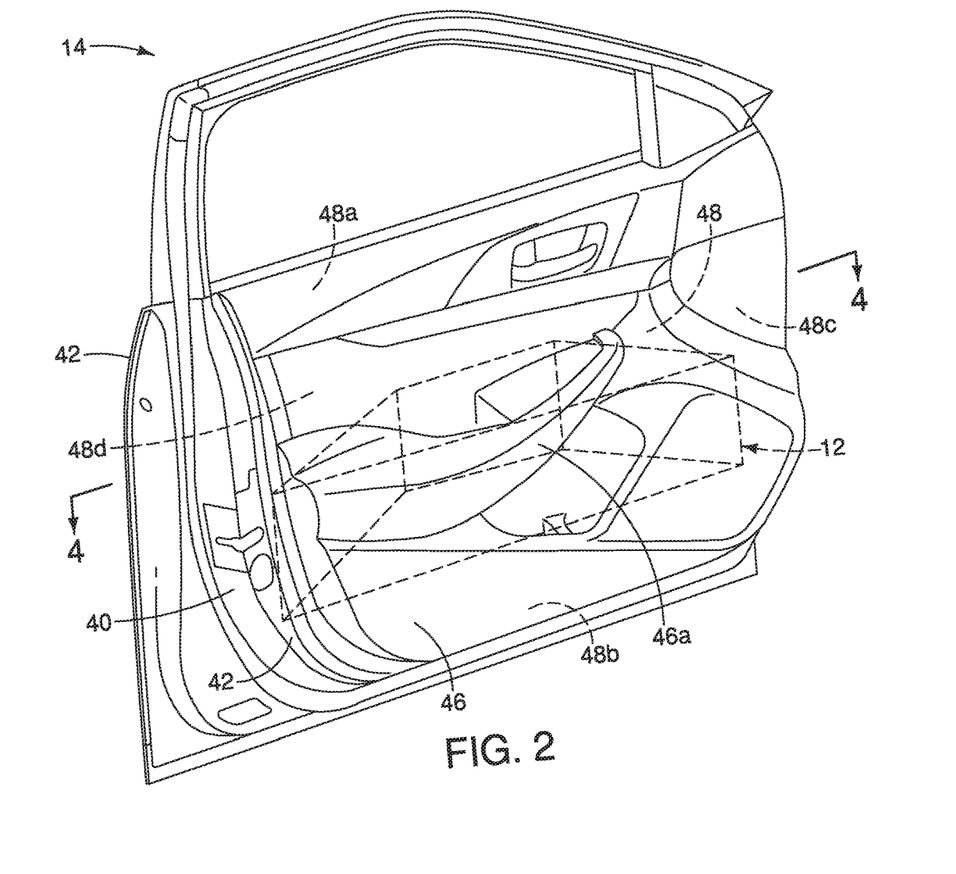
FIG. 2 is perspective view of the door removed from the vehicle showing the energy absorbing member in phantom within the hollow interior of the door, in accordance with the first embodiment.
Figure 3:
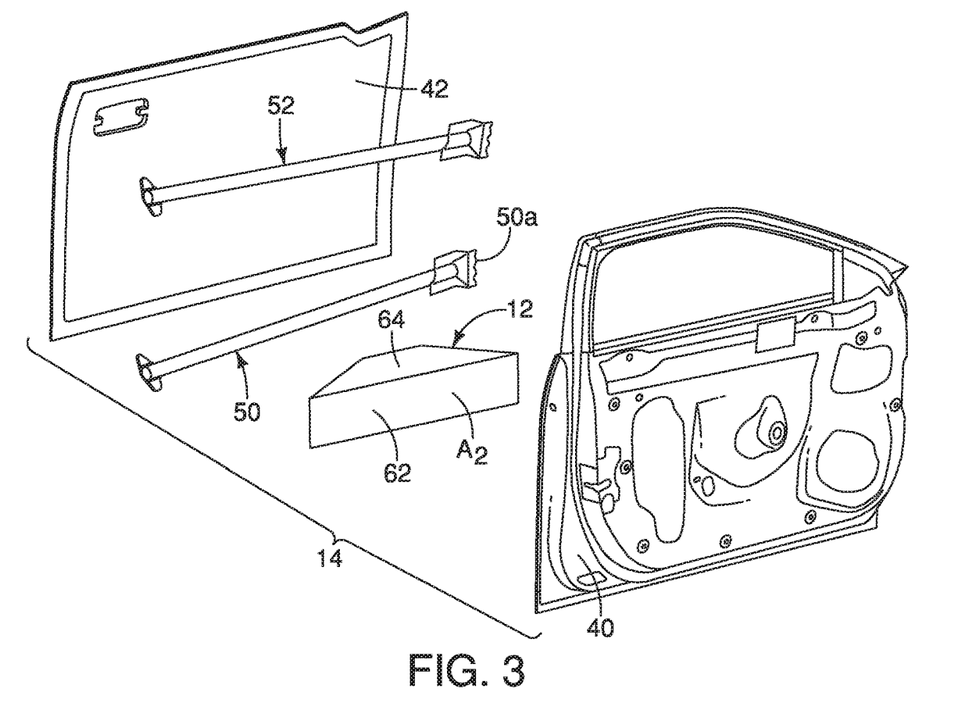
FIG. 3 is an exploded perspective view of the door showing an outer panel, an inner panel, a support structure and the energy absorbing member, in accordance with the first embodiment.
Figure 4:
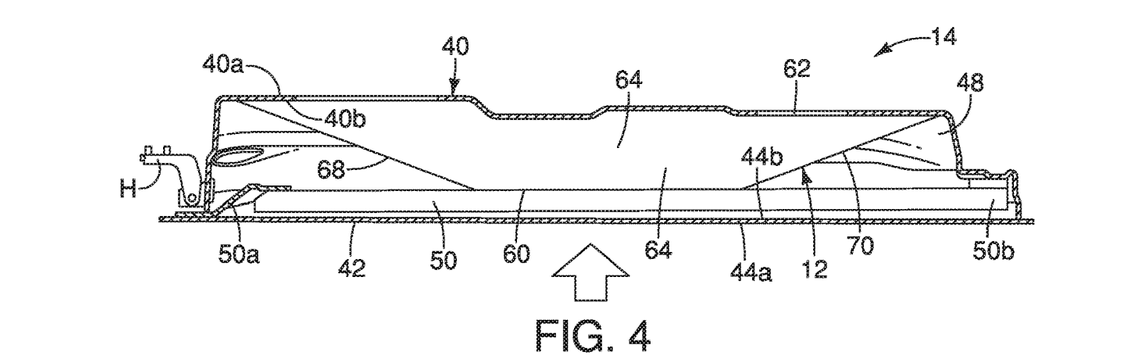
FIG. 4 is a cross-sectional view of the door taken along the line 4-4 in FIG. 2, showing the outer panel, the inner panel, the support structure and the energy absorbing member, in accordance with the first embodiment.

As shown in FIGS. 2, 3 and 4, the front door 14 includes, among other features and elements, an inner panel 40 (also referred to as an inboard panel or inner door panel), an outer panel 42 (also referred to as an outboard panel or outer door panel) and an interior trim panel 46. The inner panel 40 has an inboard facing surface 40a and an outboard facing surface 40b, as shown in FIG. 4. The outer panel 42 defines a lateral exterior side surface 44a (outboard or outer surface) and an inboard facing surface 44b. The interior trim panel 46 includes an arm rest 46a, as shown in FIG. 2. The interior trim panel 46 is attached to and overlays the inboard facing surface of the inner panel 40, as is also shown in FIG. 2. The door 14 further defines a hollow interior 48 within the front door 14 between the inner panel 40 and the outer panel 42.

The inner panel 40 and the outer panel 42 are fixedly attached to one another along respective forward edges, rearward edges and lower edges thereof in a conventional manner. More specifically, the inner panel 40 and the outer panel 42 are fixed to one another along at least a portion of an outer periphery of the inner panel 40 and an outer periphery of the outer panel 42. The inner panel 40 and the outer panel 42 define the hollow interior 48 therebetween. The hollow interior 48 having an upper end 48a and a lower end 48b. The hollow interior 48 also defines a forward end 48c and a rearward end 48d.

The respective forward, rearward and lower edges (peripheral edges) of each of the inner panel 40 and the outer panel 42 can be welded together forming a rigid attachment therebetween in a conventional manner. Since attachments between inner and outer panels of vehicle doors are conventional constructs well known in the art, further description is omitted for the sake of brevity.

Figure 5:
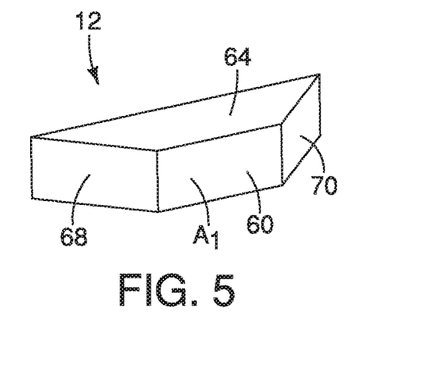
FIG. 5 is first perspective view of the energy absorbing member in accordance with the first embodiment.
Figure 6:
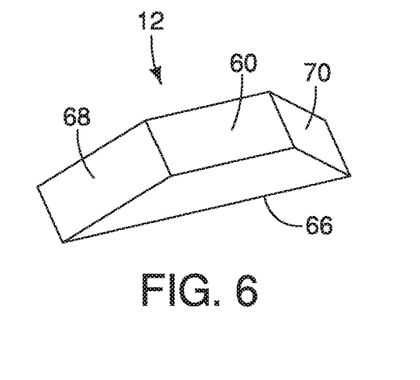
FIG. 6 is second perspective view of the energy absorbing member in accordance with the first embodiment.

The door 14 further includes at least one structural member 50 that extends approximately parallel to the vehicle longitudinal direction $D_L$ of the vehicle 10 within the hollow interior 48 of the door 14. The structural member 50 is rigidly fixed at a forward end 50a thereof to a forward portion of the inner panel 40 and the outer panel 42, and at a rearward end 50b is rigidly fixed at a rearward end to at least the inner panel 40 adjacent to the outer panel 42, as shown in FIG. 5. The structural member 50 and the energy absorbing member 12 are installed within the hollow interior 48 of the door 14.

It should be understood from the drawings and the description herein that the structural member 50 can be fixed at both forward and rearward ends 50a and 50b to one or both of the inner panel 40 and outer panel 42 within the hollow interior 48. The structural member 50 can be fixedly attached to the inner panel 40 and the outer panel 42 via conventional welding techniques, or via mechanical fasteners. However, in the depicted embodiment, the structural member 50 is fixed to the door 14 by welding techniques.

As shown in FIG. 3, the front door 14 can also include an optional second structural member 52 located above the structural member 50. The structural member 50 and second structural member 52 can be parallel to one another, or, can be angularly offset from one another (not parallel), as shown in FIG. 3.

The structural member 50 (and the second structural member 52) is located below an approximate center of the door 14 between a window opening and a lower end thereof. The structural member 50 is spaced apart in the inboard direction $D_1$ from the outer panel 42, as shown in FIG. 4. The structural member 50 is a rigid guard rail or beam that provides further rigidity and structural integrity to the overall structure of the door 14 in the event of a side impact event.

As shown in FIGS. 2, 3 and 4, the energy absorbing member 12 is installed within the hollow interior 48 between the inner panel 40 and the outer panel 42. Further, the energy absorbing member 12 has the overall shape of a trapezoid, as viewed from above (or below). More specifically, in the first embodiment, the energy absorbing member 12 has the shape of an isosceles trapezoid.

As shown in FIGS. 2-7 in a first embodiment, the energy absorbing member 12 has an outboard end surface 60, an inboard end surface 62, an upper surface 64, a lower surface 66, a forward-facing surface 68 and a rearward facing surface 70. The outboard end surface 60 (herein after referred to as the outboard surface 60) has a first predetermined surface area $A_1$, as shown in FIG. 5, and the inboard end surface 62 (hereinafter referred to as the inboard surface 62) has a second predetermined surface area $A_2$, as shown in FIG. 3. The second predetermined surface area $A_2$ is greater than the first predetermined surface area $A_1$. The forward-facing surface 68 and the rearward facing surface 70 of the energy absorbing member 12 have approximately the same surface area, in the first embodiment. The forward-facing surface 68 extends from the inboard end surface 60 to the outboard end surface 62. Similarly, the rearward facing surface 70 extends from the inboard end surface 60 to the outboard end surface 62.

In FIG. 4, the inboard surface 62 of the energy absorbing member 12 is shaped and contoured to conform with the outboard surface of the inner panel 40. It should be understood from the drawings and the description herein that the shape of the inboard surface 62 of the energy absorbing member 12 can be contoured and shaped as shown in FIG. 4, but can alternatively be flat and planar, as shown in FIGS. 2-3 and 5-7. For the sake of brevity and to make clearly the purpose and function of the energy absorbing member 12, the inboard surface 62 of the energy absorbing member 12 is considered to be flat and extends in a plane parallel to the outboard surface 60, as shown in FIGS. 2, 3 and 5-7.

Figure 7:
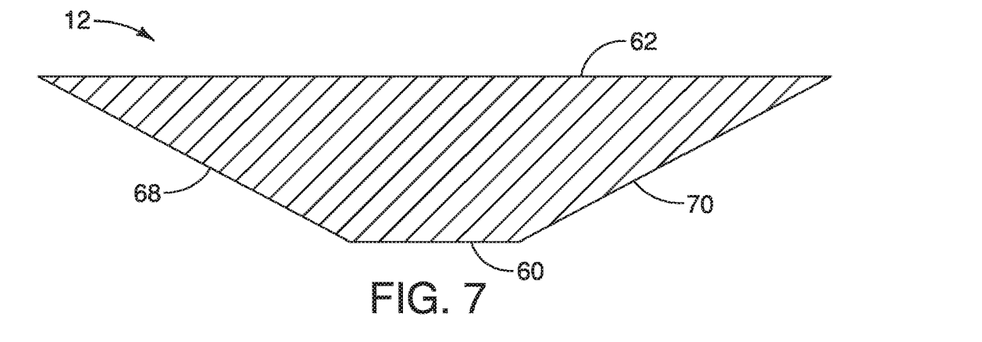
FIG. 7 is a cross-sectional view of the energy absorbing member removed from the door in accordance with the first embodiment.

As shown in FIG. 7 in cross-section, the energy absorbing member 12 is formed as a single, solid, unitary element. Further, in the first embodiment the energy absorbing member 12 can be formed of a homogenous material. Specifically, the energy absorbing member 12 is made of a resilient, slightly compressible material such as rubber, a rubber like material, an elastic polymer or resinous material, polyethylene foam, or any suitable elastic and resilient material suitable for the functions described below that are required of the energy absorbing member 12.

The energy absorbing member 12 is installed within the hollow interior 48 such that the energy absorbing member 12 is spaced apart from and below the upper end 48a of the hollow interior 48. Further, the energy absorbing member 12 is also spaced apart from and is above the lower end 48b of the hollow interior 48 of the door 14.

As shown in FIG. 4, the inboard surface 62 of the energy absorbing member 12 is in direct contact a portion of the outboard facing surface of the inner door panel 40. Further, the inboard surface 62 of the energy absorbing member 12 is attached to the outboard facing facing surface of the inner door panel 40 via, for example, an adhesive material. The outboard surface 60 of the energy absorbing member 12 is spaced apart from the outer door panel 42 with the door 14 in an unimpacted state.

As shown in FIGS. 2 and 4, the inboard surface 62 of the energy absorbing member 12 extends from proximate the forward end 48c to proximate the rearward end 48d of the hollow interior 48 of the door 14. Further, the outboard end surface 60 of the energy absorbing member 12 contacts an inboard side of the structural member 50 (the reinforcing bar 50) at a location spaced apart from the rearward end 48d and spaced apart from the forward end 48c of the hollow interior 48 of the door 14, as shown in FIG. 4.

As mentioned above with reference to FIG. 4, the structural member 50 (the reinforcing bar 50) is spaced apart from the outer panel 42 with the door 14 in a non-impacted state. Further, the door 14 (a vehicle door assembly) and the structural member 50 are configured such that the outboard end surface 60 of the energy absorbing member 12 contacts the structural member 50 (the reinforcing bar) at a location spaced apart from the rearward end 48d and spaced apart from the forward end 48c of the hollow interior, The energy absorbing member 12 is positioned within the hollow interior 48 between the inner and outer panels 40 and 42 of the door 14 such that in response to impacting forces acting on the outer panel 42, the outer panel 42 deforms slightly, contacting the structural member 50. If the level of the Newtons of force (level of force) of the impact force is large, the structural member 50 absorbs a portion of the impact force, transferring that force to the door 14. The impacting forces further act on the structural member 50 such that another portion of the impact force is transmitted therethrough to the energy absorbing member 12. The energy absorbing member 12 is configured to absorb a portion of the impact forces and transfer another portion of the impacting forces almost evenly along the vehicle longitudinal length of the inner panel 40 of the door 14, and further through the vehicle door 14 to the A-pillar 20 and the B-pillar 22 (first and second pillar structures). Thus, the inner panel 42 experiences a reduced level of impact force, as compared to a similar door structure assembled without the energy absorbing member 12.

Second Embodiment

Figure 8:
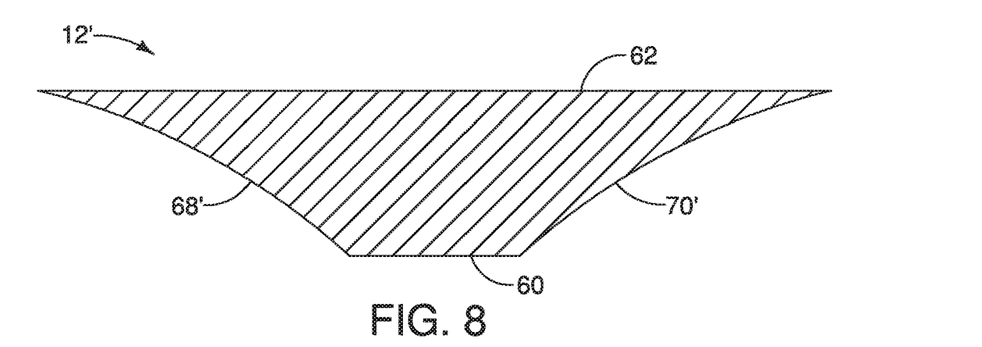
FIG. 8 is a cross-sectional view of an energy absorbing member in accordance with a second embodiment.

Referring now to FIG. 8, an energy absorbing member 12' in accordance with a second embodiment will now be explained. In view of the similarity between the first and second second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the first embodiment, the forward-facing surface 68 and the rearward facing surface 70 are generally planar surfaces. In the second embodiment, the energy absorbing member 12' is modified, as compared to the energy absorbing member 12 of the first embodiment, in that the energy absorbing member 12' includes a forward-facing surface 68' and a rearward facing surface 70' that are concaved. Specifically, as shown in FIG. 8 from above, the energy absorbing member 12' has the outboard end surface 60 and the inboard end surface 62 that are planar surfaces, as in the first embodiment, and are parallel to one another. As viewed in FIG. 8, the forward-facing surface 68' and the rearward facing surface 70' are curved and diverge away from one another moving from the outboard end surface 60 toward the inboard end surface 62.

The alternate shaping of the energy absorbing member 12' of the second embodiment can alter the energy absorbing characteristics but is conceived such that the energy absorbing member 12' can be shaped to avoid interfering with any mechanism located within the hollow interior 48 of the door 14.

Third Embodiment

Figure 9:
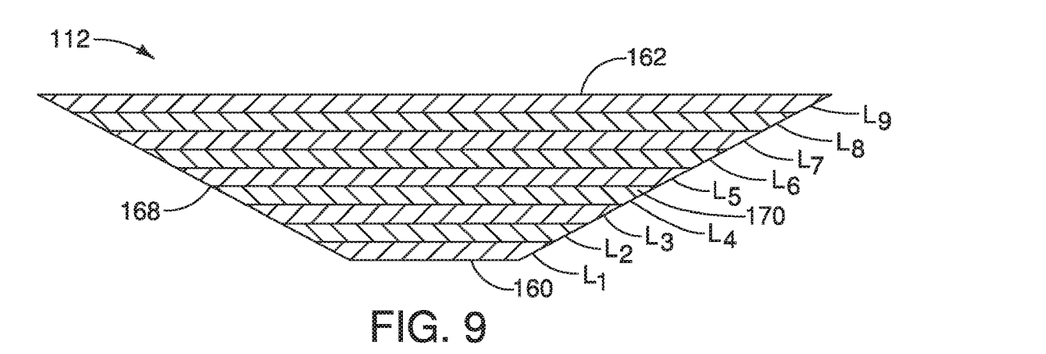
FIG. 9 is a cross-sectional view of an energy absorbing member in accordance with a third embodiment.

Referring now to FIG. 9, an energy absorbing member 112 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The energy absorbing member 112 in accordance with the third embodiment can have the same overall dimensions as the energy absorbing member 12 of the first embodiment. However, the energy absorbing member 112 of the third embodiment is not made or formed as a homogenous, but rather includes a plurality of layers $L_1$-$L_9$, each layer extending parallel to the inboard facing surface 162 and the outboard facing surface 160 and extend from a forward-facing surface 168 to a rearward facing surface 170. In the third embodiment, the energy absorbing member 112 is depicted with nine layers, layers $L_1$-$L_9$. However, the number nine is just one example. The energy absorbing member 112 can be formed with two layers, three layers, four layers, and so on, and is further not limited to nine layers, but may have more or less that the nine layers of the third embodiment.

Each of the plurality of layers $L_1$-$L_9$ of the energy absorbing member 112 has its own predetermined level of resistance to compression (resistance to compressibility). Specifically, the energy absorbing member 112 has an outboard end surface 160, an inboard end surface 162, a forward-facing surface 168, and, a rearward facing surface 170. The layer $L_1$ that defines the outboard end surface 160, has a first resistance to compressibility. The layer $L_2$ adjacent to the layer $L_1$, has a second resistance to compressibility that is greater than the first resistance to compressibility. The layer $L_3$ adjacent to the layer $L_2$, has a third resistance to compressibility that is greater than the first and second resistances to compressibility. The layer $L_4$ adjacent to the layer $L_3$, has a fourth resistance to compressibility that is greater than the first, second and third resistances to compressibility. The layer $L_5$ adjacent to the layer $L_4$, has a fifth resistance to compressibility that is greater than the first thru fourth resistances to compressibility.

The layer $L_6$ adjacent to the layer $L_5$, has a sixth resistance to compressibility that is greater than the first thru fifth resistances to compressibility. The layer $L_7$ adjacent to the layer $L_6$, has a seventh resistance to compressibility that is greater than the first thru sixth resistances to compressibility. The layer $L_8$ adjacent to the layer $L_7$, has an eighth resistance to compressibility that is greater than the first thru seventh resistances to compressibility. Finally, the layer $L_9$ adjacent to the layer $L_8$, and defines the inboard end surface 162 has a ninth resistance to compressibility that is greater than the first thru seventh resistances to compressibility. In other words, the layer $L_9$ is the stiffest and allows for the lowest level of flexibility and compressibility of the layers $L_1$ through the layer $L_9$. Conversely, the layer $L_1$ is the most flexible and compressible of all of the layers $L_1$ through the layer $L_9$.

The layering of the energy absorbing member 112 allows for fine tuning of the response of the door having the energy absorbing member 112 to an impact event, ensuring maximizing of absorption of impact energy by the energy absorbing member 112 itself, maximizing of transmission of impact energy to the A-pillar and B-pillar of the vehicle via the door structure (inner and outer door panels), and, reduction and minimizing of the amount of deformation in an inboard direction of the inner panel of the door.

Put another way, the inboard layer, layer $L_9$ that defines the inboard end surface 162 has the highest resistance to compressibility while the outboard layer, layer $L_1$ that defines the outboard end surface 160 has the lowest resistance to compressibility in response to an impacting force acting thereon.

Fourth Embodiment

Figure 10:
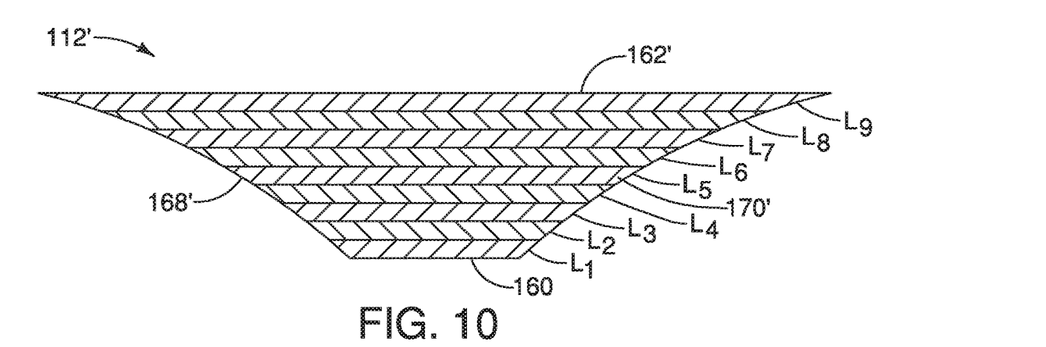
FIG. 10 is a cross-sectional view of an energy absorbing member in accordance with a fourth embodiment.

Referring now to FIG. 10, an energy absorbing member 112' in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. The parts of the fourth embodiment that differ from the parts of the first embodiment will be indicated with a single prime (').

The energy absorbing member 112' of the fourth embodiment can have the same overall dimensions as the energy absorbing member 12 of the second embodiment. The energy absorbing member 112' of the fourth embodiment includes a plurality of layers $L_1$-$L_9$, each layer extending parallel to the inboard facing surface 162 and the outboard facing surface 160 and extend from a forward-facing surface 168' to a rearward facing surface 170'. The energy absorbing member 112' is formed in a manner similar to the energy absorbing member 112 of the third embodiment in that it has a plurality of layers of material, layers $L_1$ thru $L_9$. The description of the layers $L_1$ thru $L_9$ of the third embodiment applies equally to the energy absorbing member 112' of the fourth embodiment and is omitted for the sake of brevity.

However, in the fourth embodiment, the forward-facing surface 168' and the rearward facing surface 170' are concaved and curved in a manner similar to the forward-facing surface surface 68' and the rearward facing surface 70' described above with respect to the second embodiment.

Fifth Embodiment

Figure 11:
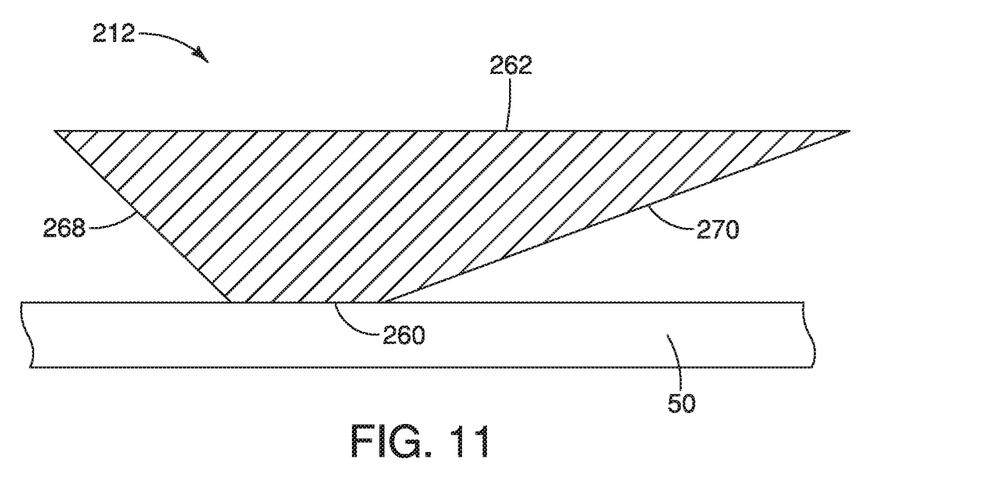
FIG. 11 is a cross-sectional view of an energy absorbing member in accordance with a fifth embodiment.

Referring now to FIG. 11, an energy absorbing member 212 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

The energy absorbing member 212 of the fifth embodiment has an outboard end surface 260, an inboard end surface 262, a forward-facing surface 268 and a rearward facing surface 270. In the fifth embodiment, the outboard end surface 260 and the inboard end surface 262 are parallel to one another, but the outboard end surface 260 is not centered relative to the inboard end surface 262.

In the first embodiment, the outboard end surface 60 and the inboard end surface 62 of the energy absorbing member 12 are arranged such that the outboard end surface 60 is centered or close to being centered relative to an overall length of the inboard end surface 62. The outboard end surface 60 has smaller surface area that the surface area of the inboard end surface 62.

In the fifth embodiment, the outboard end surface 260 off-center relative to the inboard end surface 262. Further, the forward-facing surface 268 has a surface area that is smaller than an overall surface area of the rearward facing surface 270. Put another way, FIG. 11 shows an overall length of the forward-facing surface 268 and an overall length of the rearward facing surface 270. The overall length of the rearward facing surface 270 is approximately twice the overall length of the forward-facing surface 268.

Hence, the forward-facing surface 268 is positioned closer to a front end of the inboard end surface 262 than a rearward end of inboard end surface 262.

The modified dimensions of the energy absorbing member 212 of the fifth embodiment allows for further fine tuning of the impact energy absorbing response of the energy absorbing member 212 within a door and its interaction with the structural member 50 of the door in response to a side impact event.

It should be understood from the drawings and the description herein that the energy absorbing member 212 of the fifth embodiment can be flipped such that the forward-facing surface 268 and the rearward facing surface 270 have reversed dimensions. Specifically, in the fifth embodiment, the overall lengths of the rearward facing surface 270 and the forward-facing surface 268 can be altered or reversed such that the forward-facing surface 268 has an overall length (and surface area) that is twice the overall length (and surface area) than that of the rearward facing surface 270.

Sixth Embodiment

Figure 12:
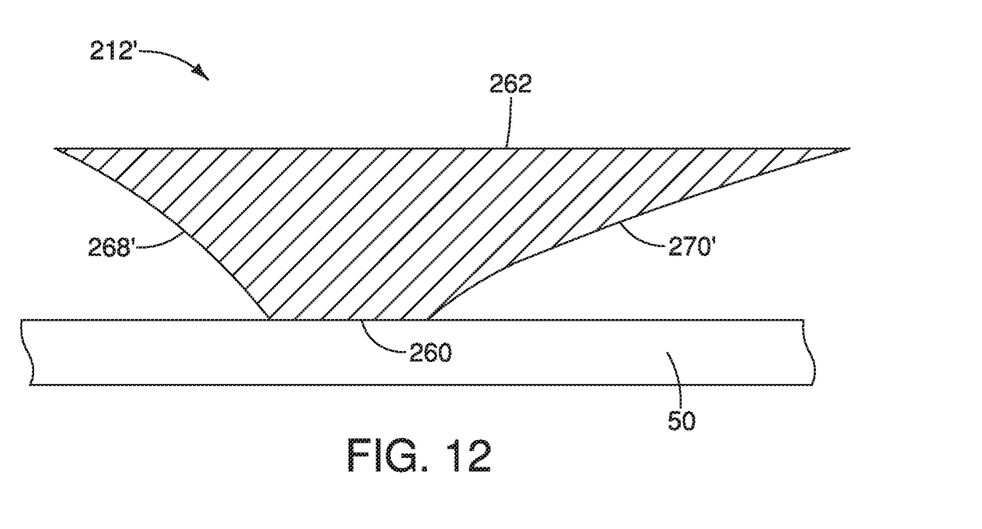
FIG. 12 is a cross-sectional view of an energy absorbing member in accordance with a sixth embodiment.

Referring now to FIG. 12, an energy absorbing member 212' in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity. The parts of the sixth embodiment that differ from the parts of the first embodiment will be indicated with a single prime (').

In the sixth embodiment, energy absorbing member 212' is identical to the energy absorbing member 212 of the fifth embodiment, except that a forward-facing surface 268' and a rearward facing surface 270' have concaved and curved surfaces.

Seventh Embodiment

Figure 13:
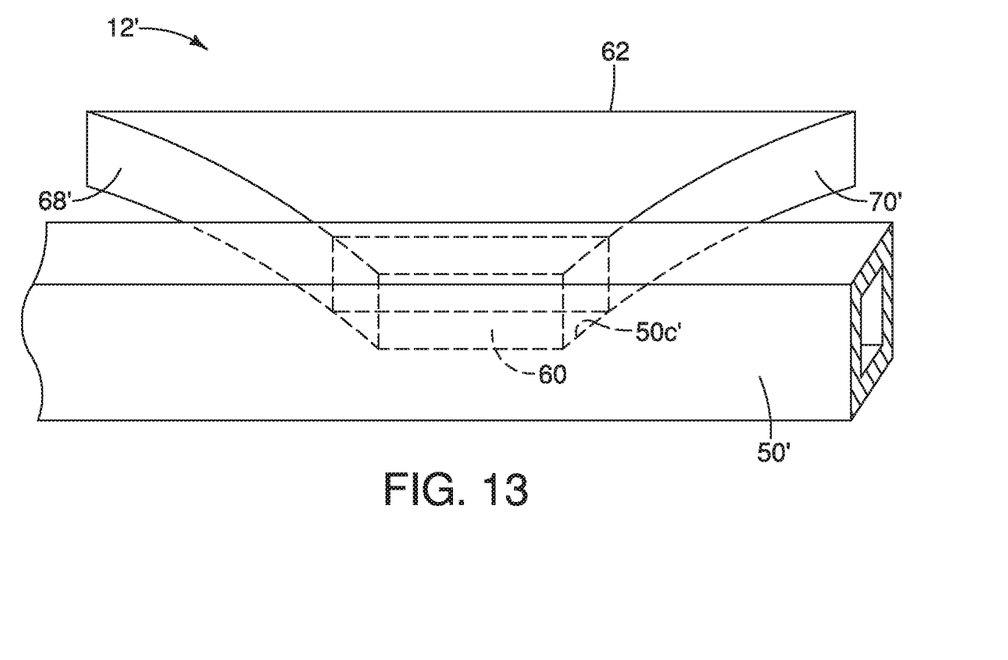
FIG. 13 is a perspective view of an energy absorbing member with an outboard end of the energy absorbing member installed with a recessed area of the structural member, in accordance with a seventh embodiment.

Referring now to FIG. 13, an energy absorbing member 12' in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity. The parts of the seventh embodiment that differ from the parts of the first embodiment will be indicated with a single prime (').

In the seventh embodiment, the structural member 50 of the first embodiment has been modified to include a recessed area 50'c. The outboard end surface 60 of the energy absorbing member 12' is fitted into the recessed area 50'c and retained therein.

Eighth Embodiment

Figure 14:
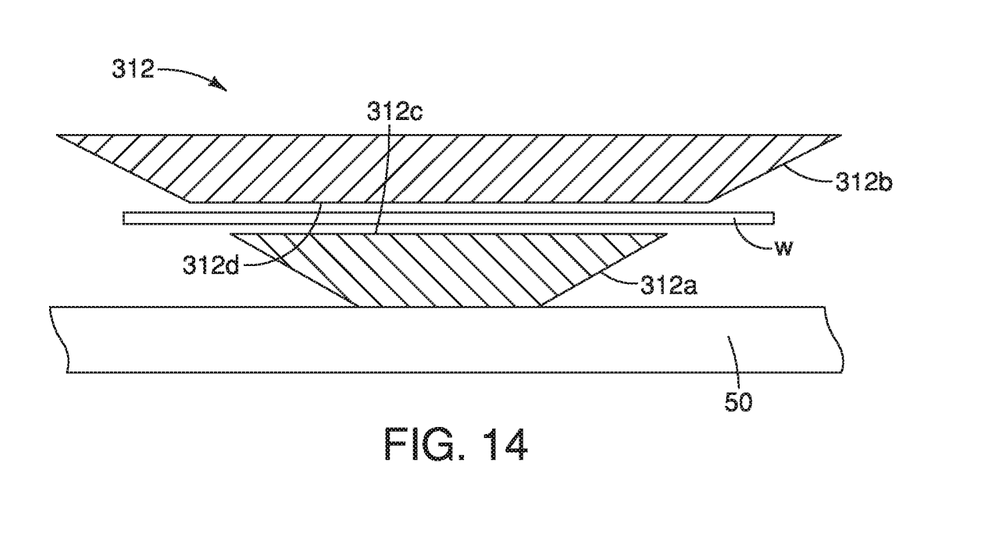
FIG. 14 a perspective view of an energy absorbing member that is divided into two spaced apart sections defining a gap therebetween dimension to allow window glass to move up and down within the gap, in accordance with an eighth embodiment.

Referring now to FIG. 14, an energy absorbing member 312 in accordance with an eighth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

The energy absorbing member 312 of the eighth embodiment is positioned within the door such that the energy absorbing member 312 is located within a path defined by movement a door window W. Hence, the energy absorbing member 312 is divided into a first part 312a and a second part 312b. The first part 312a is fixed to the structural member 50. The second part 312b is fixed to the inner door panel (not shown) of the door (not shown). A gap is defined between the first part 312a and the second part 312b that coincides with the path of the door window W. Therefore, with the door in a non-impacted state, the door window W can be rolled up and down (closed and opened) without interference from the energy absorbing member 312.

During a side impact event, the impact energy can deform the structural member 50, moving the first part 312a of the energy absorbing member 312 into contact with the window W (if rolled down or opened) or into contact with the second part 312b (if the window W is rolled up or closed). Thereafter, further impact force can cause further movement of the window W or the first part 312a into contact with the second part 312b such that impact energy is distributed as described above with respect to the first embodiment.

Ninth Embodiment

Figure 15:
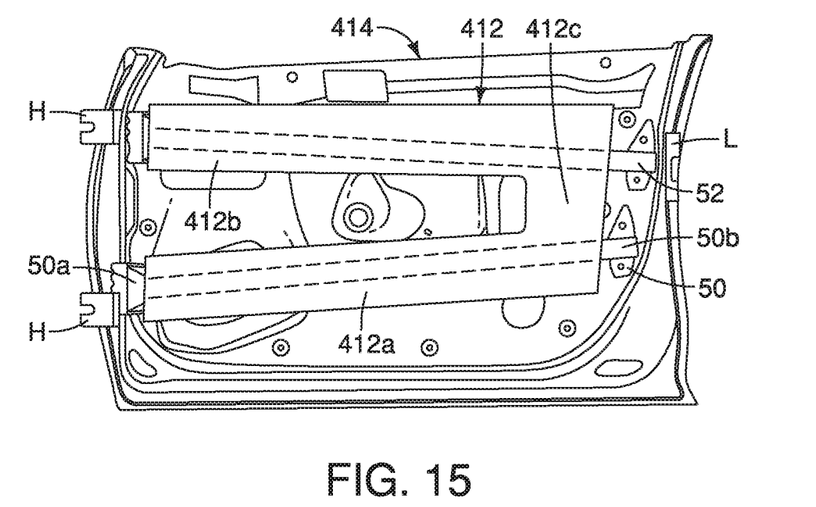
FIG. 15 is a plan view a door with an inner panel of the door removed revealing an energy absorbing member having a U-shape with two non-parallel sections joined at a rearward end thereof, the energy absorbing member extending between two hinges and a single door latch in accordance with a ninth embodiment.

Referring now to FIG. 15, an energy absorbing member 412 in accordance with a ninth embodiment will now be explained. In view of the similarity between the first and ninth embodiments, the parts of the ninth embodiment that are identical to the parts of the first embodiment will be given the same reference numerals as the parts of the first embodiment. Moreover, the descriptions of the parts of the ninth embodiment that are identical to the parts of the first embodiment may be omitted for the sake of brevity.

In the ninth embodiment, a door 414 is identical to the door 14 of the first embodiment, except that the second structural member 52 is installed to the door 14. Further, the energy absorbing member 412 has an overall U-shape, turned on its side. The energy absorbing member 412 includes a first portion 412a, a second portion 412b and a joining portion 412c. The first portion 412a extends along an inboard side of the structural member 50. The second portion 412b extends along an inboard side of the structural member 52. The joining portion 412c extends between rearward ends of each of the first and second portions 412a and 412b, joining them together. The overall profile of the energy absorbing member 412 (as viewed from above) is identical to the first embodiment in FIG. 4.

However, in the ninth embodiment, the two structural members 50 and 52 are vertically spaced apart from one another and are not parallel. The first portion 412a extends along the structural member 50 and the second portion 412b extends along the structural member 52. In response to a side impact event, the energy absorbing member 412 provides a further improvement to the impact energy absorption characteristics of the door 414. It should be understood that the first portion 412a and the second portion 412b are not parallel to one another.

The energy absorbing member 412 therefore extends from the two hinges that pivotally fix the door 412 to the vehicle, to the latch mechanism L that fixes the door 414 to the B-pillar of the vehicle 10 when the door 414 is in the closed orientation.

Tenth Embodiment

Figure 16:
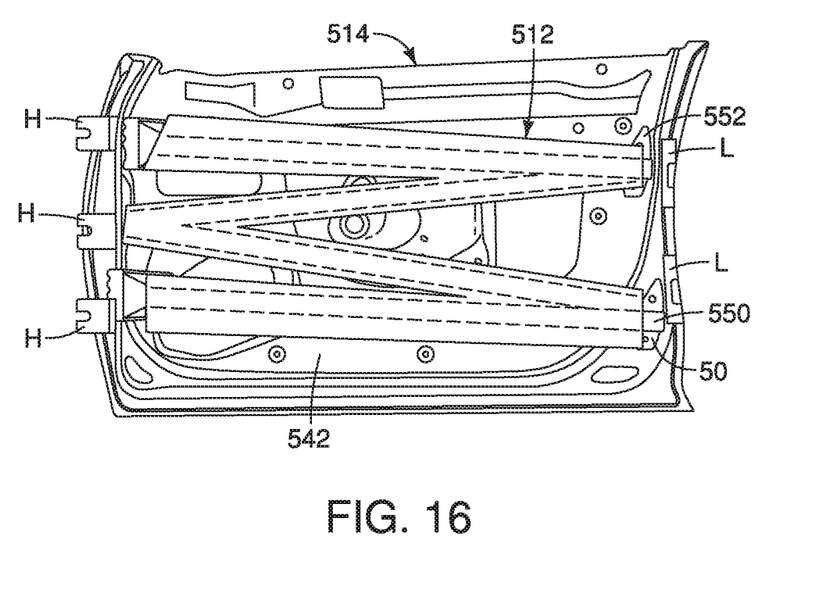
FIG. 16 is a plan view a door with an inner panel of the door removed revealing an energy absorbing member having a M-shape with four non-parallel sections, the energy absorbing member extending between three hinges and two door latches in accordance with a tenth embodiment.

Referring now to FIG. 16, an energy absorbing member 512 installed within a door 514 in accordance with a tenth embodiment will now be explained. In view of the similarity between the first and tenth embodiments, the parts of the tenth embodiment that are identical to the parts of the first embodiment will be given the same reference numerals as the parts of the first embodiment. Moreover, the descriptions of the parts of the tenth embodiment that are identical to the parts of the first embodiment may be omitted for the sake of brevity.

In the tenth embodiment, the door 514 includes a V-shaped structural member 550 and a second V-shaped structural member 552, as well as three hinges H and two latch mechanism L. The V-shaped structural member 550 and the second V-shaped structural member 552 are fixedly attached within the door 514. The energy absorbing member 512 has an overall M-shape with four legs thereof. The four legs define two rearward ends that are located adjacent to a respective ones of the latch mechanism L, with three forward ends extend to a location adjacent to a corresponding ones of the three hinges.

Eleventh Embodiment

Figure 17:
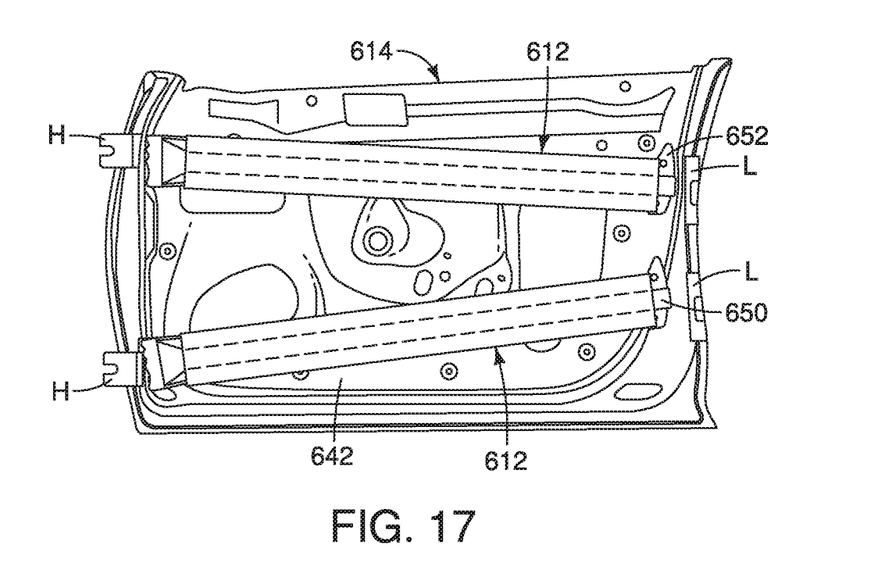
FIG. 17 is a plan view a door with an inner panel of the door removed revealing an energy absorbing member having two non-parallel sections, the door having two hinges and two latches, with one of the non-parallel sections extending from an upper one of the hinges to an upper one of the latches, and the other of the non-parallel sections extending from a lower one of the hinges to a lower one of the latches in accordance with an eleventh embodiment.

Referring now to FIG. 17, a pair of energy absorbing members 612 in accordance with an eleventh embodiment will now be explained. In view of the similarity between the first and eleventh embodiments, the parts of the eleventh embodiment that are identical to the parts of the first embodiment will be given the same reference numerals as the parts of the first embodiment. Moreover, the descriptions of the parts of the eleventh embodiment that are identical to the parts of the first embodiment may be omitted for the sake of brevity.

In the eleventh embodiment, the door 614 has a structural member 650 and a second structural member 652. The structural member 650 and the second structural member 652 are vertically spaced apart from one another, and, are angularly offset from one another in a non-parallel relationship. The door 614 has two hinges H and two latches L. The structural member 650 extends between the lower of the two hinges H and the lower of the two latches L. The second structural member 652 extends between the upper of the two hinges H and the upper of the two latches L.

A lower one of the pair of energy absorbing members 612 is attached to the structural member 650 in a manner described above with respect to the first embodiment. The lower one of the pair of energy absorbing members 612 further has the same overall shape and configuration of the energy absorbing members 12 of the first embodiment.

An upper one of the pair of energy absorbing members 612 is attached to the second structural member 652 in a manner described above with respect to the first embodiment. The upper one of the pair of energy absorbing members 612 further has the same overall shape and configuration of the energy absorbing members 12 of the first embodiment.

Twelfth Embodiment

Figure 18:
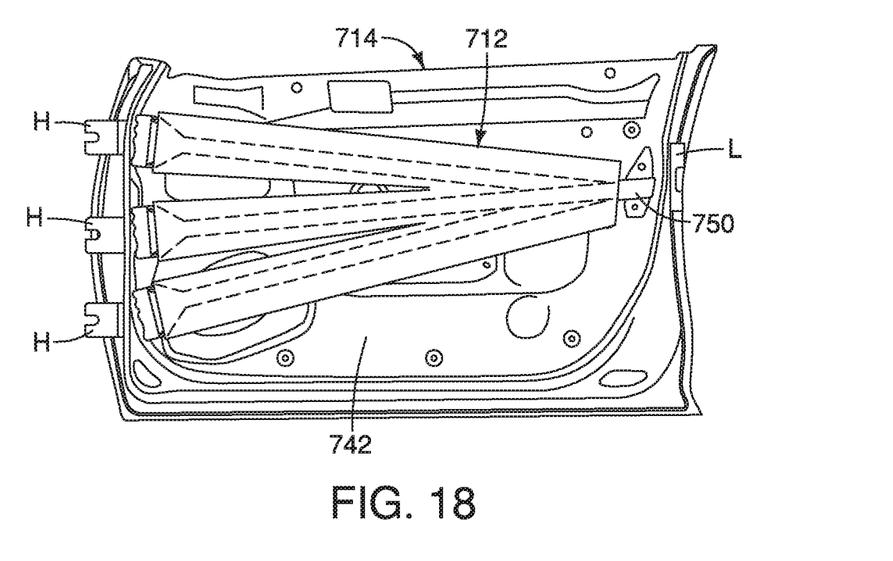
FIG. 18 is a plan view a door with an inner panel of the door removed revealing an energy absorbing member having another M-shape installed to the door and extending between three hinges and a single door latch in accordance with a twelfth embodiment.

Referring now to FIG. 18, a pair of energy absorbing members 712 in accordance with a twelfth embodiment will now be explained. In view of the similarity between the first and twelfth embodiments, the parts of the twelfth embodiment that are identical to the parts of the first embodiment will be given the same reference numerals as the parts of the first embodiment. Moreover, the descriptions of the parts of the twelfth embodiment that are identical to the parts of the first embodiment may be omitted for the sake of brevity.

In the twelfth embodiment, the door 714 has a structural member 750. The door 714 has three hinges $H_1$, $H_2$ and $H_3$, and one latch L. The structural member 750 has three branches, 750*a*, 750*b* and 750*c* that converge into one rearward end 750*d*. The branch 750*a* extends to the upper most hinge $H_1$, the branch 750*b* extends to the middle hinge $H_2$ and the branch 750*c* extends to the lowermost hinge $H_3$. The rearward end 750*d* extends to the latch L.

The energy absorbing member 712 further has the same overall shape, as viewed from above, the energy absorbing members 12 of the first embodiment.

The various vehicle elements, structures and components (other than the various embodiments of the structural members and the energy absorbing member) are conventional components that are well known in the art. Since vehicle elements, structures and components are well known in the art, these features will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle door assembly. Accordingly, these terms, as utilized to describe the present invention should be interpreted relative to a vehicle equipped with the vehicle door assembly.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle door assembly, comprising:
an inner door panel having an inboard facing surface and an outboard facing surface;
an outer door panel having an exterior side surface and an inboard facing surface, the outer door panel being configured such that at least a portion of an outer periphery thereof is fixed to an outer periphery of the inner door panel, the inner door panel and the outer door panel defining a hollow interior therebetween, the hollow interior having an upper end and a lower end;
an interior trim panel attached to and overlaying the inboard facing surface of the inner door panel; and
an energy absorbing member installed within the hollow interior between the outboard facing surface of the inner door panel and the inboard facing surface of the outer door panel, the energy absorbing member having an outboard end surface with a first predetermined surface area and an inboard end surface having a second predetermined surface area greater than the first predetermined surface area, the energy absorbing member being spaced apart from the upper end of the hollow interior and being spaced apart from the lower end of the hollow interior, the energy absorbing member has an overall trapezoid shape as viewed from above, with the inboard end surface and the outboard end surface extending approximately parallel to one another.

2. The vehicle door assembly according to claim 1, wherein
the inboard end surface of the energy absorbing member is in contact a portion of the outboard facing surface of the inner door panel.

3. The vehicle door assembly according to claim 2, wherein
the inboard end surface of the energy absorbing member is directly attached to the portion of the outboard facing surface of the inner door panel.

4. The vehicle door assembly according to claim 1, wherein
the outboard end surface of the energy absorbing member is spaced apart from the outer door panel in an unimpacted state.

5. The vehicle door assembly according to claim 1, wherein
the hollow interior between the inner door panel and the outer door panel defines a forward end and a rearward end, and
the inboard end surface of the energy absorbing member extends from proximate the forward end to proximate the rearward end of the hollow interior.

6. A vehicle door assembly, comprising:
an inner door panel;
an outer door panel being configured such that at least a portion of an outer periphery thereof is fixed to an outer periphery of the inner door panel, the inner door panel and the outer door panel defining a hollow interior therebetween, the hollow interior having an upper end and a lower end;
an energy absorbing member installed within the hollow interior between the inner door panel and the outer door panel, the energy absorbing member having an outboard end surface with a first predetermined surface area and an inboard end surface having a second predetermined surface area greater than the first predetermined surface area, the energy absorbing member being spaced apart from the upper end of the hollow interior and being spaced apart from the lower end of the hollow interior; and
a reinforcing bar installed within the hollow interior, a forward end of the reinforcing bar being fixed to a surface of at least one of the inner door panel or the outer door panel proximate the forward end of the hollow interior and a rearward end of the reinforcing bar being fixed to a surface of at least one of the inner door panel or the outer door panel proximate the rearward end of the hollow interior.

7. The vehicle door assembly according to claim 6, wherein
the outboard end surface of the energy absorbing member contacts the reinforcing bar at a location spaced apart from the rearward end and spaced apart from the forward end of the hollow interior.

8. The vehicle door assembly according to claim 1, wherein
the energy absorbing member has a forward-facing surface and a rearward facing surface, each of the forward-facing surface and the rearward facing surface extending from the inboard end surface to the outboard end surface.

9. The vehicle door assembly according to claim 8, wherein
the forward-facing surface of the energy absorbing member has a surface area greater than a surface area of the rearward facing surface.

10. The vehicle door assembly according to claim 8, wherein
the forward-facing surface of the energy absorbing member has a surface area less than a surface area of the rearward facing surface of the energy absorbing member.

11. The vehicle door assembly according to claim 1, wherein
the energy absorbing member is formed as a single, solid, unitary element.

12. The vehicle door assembly according to claim 1, wherein
the energy absorbing member is formed with a plurality of layers, each layer extending parallel to the inboard facing surface and the outboard facing surface of the energy absorbing member, each of the plurality of layers of the energy absorbing member has a differing value of compressibility.

13. The vehicle door assembly according to claim 12, wherein
an inboard layer of the plurality of layers of the energy absorbing member that defines the inboard end surface has a high resistance to compressibility, and
an outboard layer of the plurality of layers of the energy absorbing member that defines the outboard end surface, has a low resistance to compressibility,
such that inboard layer is stiffer than the outboard layer such that the outboard layer compresses more easily that the inboard layer in response to an impacting force acting thereon.

14. The vehicle door assembly according to claim 13, wherein the plurality of layers of the energy absorbing member each have a greater resistance to compressibility than an adjacent outboard one of the plurality of layers of the energy absorbing member.

15. A vehicle, comprising
a vehicle body structure that includes a first pillar structure and a second pillar structure with a door opening defined between the first and second pillar structures; and
a vehicle door assembly that includes:
an inner door panel;
an outer door panel being configured such that at least a portion of an outer periphery thereof is fixed to an outer periphery of the inner door panel, the inner door panel and the outer door panel defining a hollow interior therebetween, the hollow interior having an upper end and a lower end;
an energy absorbing member installed within the hollow interior between the inner door panel and the outer door panel, the energy absorbing member having an outboard end surface with a first predetermined surface area and an inboard end surface having a second predetermined surface area greater than the first predetermined surface area, the energy absorbing member being spaced apart from the upper end of the hollow interior and being spaced apart from the lower end of the hollow interior;
a reinforcing bar installed within the hollow interior, a forward end of the reinforcing bar being fixed to a surface of at least one of the inner door panel or the outer door panel proximate the forward end of the hollow interior and a rearward end of the reinforcing bar being fixed to a surface of at least one of the inner door panel or the outer door panel proximate the rearward end of the hollow interior, the reinforcing bar being spaced apart from the outer door panel with the vehicle door assembly in a non-impacted state,
wherein the vehicle door assembly is configured such that the outboard end surface of the energy absorbing member contacts the reinforcing bar at a location spaced apart from the rearward end and spaced apart from the forward end of the hollow interior, and
wherein the energy absorbing member is positioned within the hollow interior between the inner and outer door panels such that in response to the impacting forces acting on the outer door panel, the outer door panel deforms contacting the reinforcing bar and transmits at least a portion of the impacting forces thereto and in response to impacting forces acting on the outer door panel from outside the vehicle body structure, the energy absorbing member is configured to absorb at least a portion of the impacting forces and transfer at least another portion of the impacting forces through the vehicle door to the first and second pillar structures.

16. The vehicle according to claim 15, wherein
the energy absorbing member is formed with a plurality of layers, each layer extending parallel to the inboard facing surface and the outboard facing surface, and
the plurality of layers of the energy absorbing member each have a greater resistance to compressibility than an adjacent outboard one of the plurality of layers of the energy absorbing member.

17. The vehicle door assembly according to claim 1, further comprising
a latch mechanism attached to one or both of the inner door panel and the outer door panel, and, a rearward end of the energy absorbing member is located adjacent to the latch mechanism.

18. The vehicle door assembly according to claim 6, further comprising
a latch mechanism attached to one or both of the inner door panel and the outer door panel, and, a rearward end of the energy absorbing member is located adjacent to the latch mechanism.

19. The vehicle door assembly according to claim 6, further comprising
a latch mechanism attached to a rearward end of the vehicle door assembly with a portion of the energy absorbing member being located at vertical height that is the same as the vertical height as the latch mechanism.

* * * * *